United States Patent
Gill

Patent Number: 5,306,134
Date of Patent: Apr. 26, 1994

[54] FLUID FORCING NOZZLE

[75] Inventor: Antony Gill, Rochester, Mich.

[73] Assignee: Automotive Plastic Technologies, Sterling Heights, Mich.

[21] Appl. No.: 714,117

[22] Filed: Jun. 12, 1991

[51] Int. Cl.$^5$ ............................................. B29C 45/20
[52] U.S. Cl. ........................ 425/566; 137/625.41; 264/572; 425/571; 425/584
[58] Field of Search ............... 425/542, 562, 564, 584, 425/566, 568, 569, 570, 571, 130; 264/328.8, 328.12, 328.13, 572; 137/625.41, 625.43, 625.44, 625.46

[56] References Cited

U.S. PATENT DOCUMENTS

| | | | |
|---|---|---|---|
| Re. 28,721 | 2/1976 | Farrell | 425/159 |
| Re. 30,335 | 7/1980 | Johansson | 425/548 |
| 1,782,678 | 11/1930 | Bronson et al. | 137/625.41 |
| 1,842,894 | 1/1932 | Breegle | 137/625.41 |
| 3,461,870 | 8/1969 | Van Linge | 137/625.46 |
| 4,082,226 | 4/1978 | Appleman et al. | 239/584 |
| 4,099,904 | 7/1978 | Dawson | 425/563 |
| 4,101,617 | 7/1978 | Friederich | 264/572 |
| 4,685,881 | 8/1987 | Sasaki | 425/562 |
| 4,740,150 | 4/1988 | Sayer | 425/562 |
| 4,781,554 | 11/1988 | Hendry | 425/564 |
| 4,824,732 | 4/1989 | Hendry et al. | 428/542.8 |
| 4,905,901 | 3/1990 | Johnson | 239/135 |
| 4,915,133 | 4/1990 | Harrison | 137/625.47 |
| 4,935,191 | 6/1990 | Baxi | 264/572 |
| 4,942,006 | 7/1990 | Loren | 264/50 |
| 4,943,407 | 7/1990 | Hendry | 264/572 |
| 4,990,083 | 2/1991 | Bernhardt | 425/547 |
| 5,015,166 | 5/1991 | Baxi | 425/149 |
| 5,028,377 | 7/1991 | Hendry | 264/572 |
| 5,066,214 | 11/1991 | Baxi et al. | 264/572 |
| 5,106,283 | 4/1992 | Jauer et al. | 264/572 |
| 5,110,533 | 5/1992 | Hendry | 264/572 |
| 5,112,563 | 5/1992 | Baxi | 264/572 |
| 5,114,660 | 5/1992 | Hendry | 264/572 |
| 5,200,127 | 4/1993 | Nelson | 264/85 |

FOREIGN PATENT DOCUMENTS 1198241 7/1970 United Kingdom ............... 425/584

*Primary Examiner*—Richard L. Chiesa
*Attorney, Agent, or Firm*—Howard & Howard

[57] ABSTRACT

An apparatus for gas assisted injection molding having a fluid forcing nozzle with a minimum of moving parts is shown. This apparatus produces an injected molded article by forcing a stream of molding material from a source of molten plastic through a fluid forcing nozzle into an article forming mold space. After the desired amount of material has been injected to fill the mold cavity, the flow through the fluid forcing nozzle is shut off, and replaced by a pressurized fluid or gas flow. The fluid forcing nozzle has an operable valve part operable between a first position and a second position. When the valve part is in its first position, a continuous flow channel from an injection molding machine to a mold sprue is provided for a molten plastic material. When the valve part is in its second position, a portion of the first flow channel is blocked, and a flow channel for an injection gas to the mold sprue is provided.

19 Claims, 1 Drawing Sheet

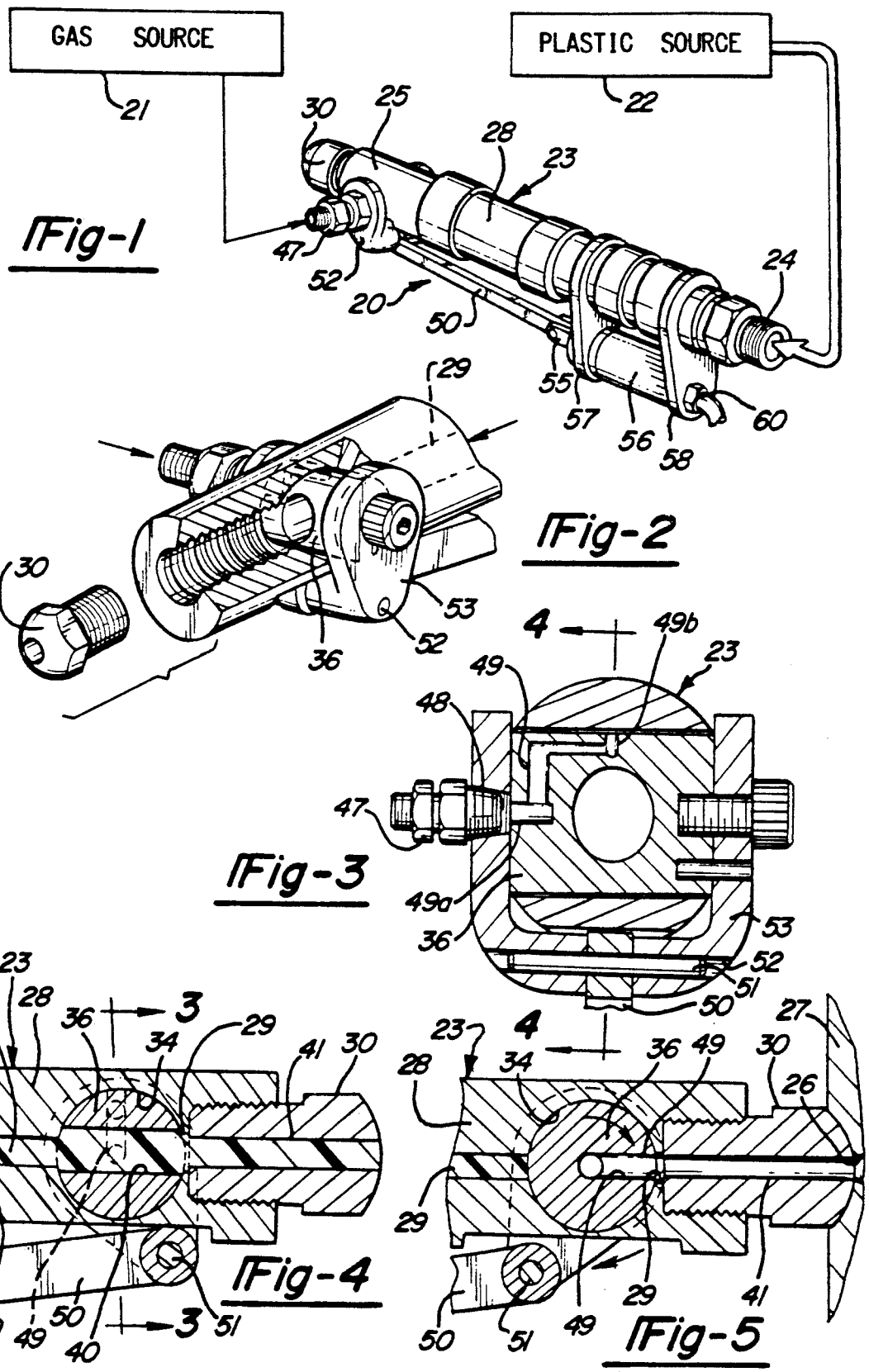

FLUID FORCING NOZZLE

BACKGROUND OF THE INVENTION

1. Field of the Invention

The present invention relates to a fluid forcing nozzle. More particularly the invention relates to a fluid forcing nozzle of the type which may alternately inject a fluid or a gas into the interior of a mold cavity. The construction disclosed is greatly simplified in comparison to prior art nozzles, and uses a minimum of moving parts.

2. Description of the Prior Art

The use of nozzles to force fluids and/or gases into the interiors of various types of cavities is well known in the art. One such use of fluid forcing nozzles is in the field of injection molding, and more particularly in the field of gas assisted injection molding. Gas assisted injection molding is known in the art as a preferred way of making larger and more complicated parts without having the problems of sink marks and the like in thick rib sections or when complicated cross sections are involved.

In this type of injection molding, these large and complicated pieces are made of a hollow construction by injecting a fluid or gas into the interior of a part while it is being formed in a mold cavity. It is known that the gas or fluid which is injected into the interior of the mold cavity will follow the easiest path. Since it is also known that the molten plastic or synthetic resin will generally cool and harden from the mold cavity wall inwardly, the interior of the part will stay fluid longer, and the gas will penetrate the sorer and warmer portions of the part. The softer and warmer portions of the part are generally found in the thicker sections where there is a structural rib, etc. The injection gas, by following this path, creates a hollow within the plastic, and that hollow can be expanded by the addition of pressure outwardly to fill the mold cavity.

If the gas pressure is held at an effectively constant level while the plastic part cools, the surface finish of the plastic part will be greatly enhanced by the elimination of sink marks, etc. Along with the idea of the injection of the gas or fluid into the interior of the mold cavity through the fluid forcing nozzle came the need to vent the gas to relieve the pressure within the part before the mold could be opened. Failure to relieve this pressure, in some cases, caused the part to explode when the mold opened. Many solutions were tried to discover a satisfactory way of introducing the gas into the interior of the plastic part, and then to vent the gas before opening the mold cavity.

An apparatus for venting the gas after injecting the fluid through the fluid forcing nozzle, and before opening the mold cavity, is described in U.S. Pat. No. 4,943,407 issued Jul. 24, 1990 to James W. Hendry. Generally this invention involves venting the gas to atmosphere through a specialized sprue bushing in which the sprue bustling includes a first body part in which a second body part or cylindrical pin is mounted for movement upon the activation of an actuator. The pin has two flow paths which are alternately used. One path allows the passage of plastic through the bushing into the sprue, and from there into the interior of the mold cavity. The second path allows injection or venting of gas from the interior of said mold cavity.

However, by creating the two flow paths in the mold sprue bushing, one is required to provide the special sprue bushing valves for each mold being used. When molds having multiple cavities are used, this increases the cost of the mold significantly. In addition, mold sprue bushings are generally rather small, and, therefore, providing moving parts therein to allow the injection of plastic and gas alternately has proven difficult.

Applicant's assignee, to eliminate the problems in the prior art, developed the idea of forcing fluid into the interior of the mold cavity through the nozzle, which is a larger device, can be more easily manufactured, and can serve a large number of mold cavities. One such nozzle is described in co-pending U.S. patent application Ser. No. 07/628,746, filed on Dec. 17, 1990, now U.S. Pat. No. 5,200,127 and assigned to the common assignee of the present invention.

Another such nozzle is described in a co-pending application by the inventor of the present application filed on every date herewith entitled "INJECTION NOZZLE" and assigned to the common assignee of the present invention. These nozzles have proven to be satisfactory for many applications. However, for some applications it was desired to develop a nozzle with an absolute minimum of moving parts to prevent problems known in the art of injection molding.

SUMMARY OF THE PRESENT INVENTION

In accordance with the present invention, there is provided an apparatus for gas-assisted injection molding having a fluid forcing nozzle with a minimum of moving parts. This apparatus produces an injected molded article by forcing a stream of molding material from a source of molten plastic through a fluid forcing nozzle into an article forming mold space. After the desired amount of material has been injected to fill the mold cavity, the flow through the fluid forcing nozzle is shut off, and replaced by a pressurized fluid or gas flow through a second flow path. After the gas is injected, the molded article is allowed to at least partially cool while the article is under pressure. When the plastic article has cooled sufficiently to be self supporting, the gas within it is vented to atmosphere by way of the same passages by which it entered the mold cavity.

The fluid forcing, injection, or shut off nozzle of the present invention includes a body portion having an upstream end for communication with an end of an associated injection molding machine, and a downstream end for fluid communication with the sprue of an associated mold body. Between the upstream end and the downstream end of the body portion is provided an axially extending bore, which may be of cylindrical, oval, or other desired cross section. A valve cavity is provided in the bore, and has an operable valve part which completes a first flow channel when in a first position for the molten plastic material and a second flow channel, when in a second position, to provide a flow channel for the injection gas.

In a first embodiment of the invention there is provided a gas source, a fluid forcing nozzle, and a molten plastic or resin source.

In a second modification of the present invention, a fluid forcing nozzle is provided having a minimum of parts. Said nozzle includes a body portion having an upstream end for communication with an end of an associated injection molding machine, and a downstream end for fluid communication with a sprue of an associated mold body. The body portion includes an axially extending bore for establishing a flow channel, a valve cavity at or near the downstream end of the axially extending bore, and in fluid communication therewith, and a second bore in fluid communication with said valve cavity. A barrel-shaped, cylindrical, or tapered valve part mounted in the valve cavity is operable between a first position and a second position. When the valve part is in its first position, a-continuous flow channel from the injection molding machine to the mold sprue is provided for the molten plastic material. When the valve part is in its second position, a portion of the first flow channel is blocked, and a flow channel from the gas source to the mold sprue is provided.

Thus, an object of the present invention is to provide a fluid forcing nozzle which may be used in an apparatus for gas assisted injection molding which provides for injection of molten plastic or resin material into a mold cavity through a first flow channel. This is followed by a halting of the resin injecting process and replacement thereof with injection of a pressurized fluid or gas through a second flow channel.

A further object of the present invention is to provide an injection molding apparatus utilizing a fluid forcing nozzle of the foregoing nature.

A still further object of the present invention is to provide an apparatus for replacing the flow of molten plastic with a flow of injection gas without utilizing the mold sprue.

A further object of the present invention is to provide an improved gas assisted injection molding apparatus where a "sprue break" is not necessary for venting the gas within the molded article before opening the mold cavity.

A still further object of the present invention is to provide a fluid forcing nozzle for use in injecting molding equipment having a minimum of moving parts.

Further objects and advantages of this invention will be apparent from the following description and appended claims, reference being had to the accompanying drawings forming a part of the specification, wherein like reference characters designate corresponding parts in the several views.

BRIEF DESCRIPTION OF THE DRAWINGS

FIG. 1 is a diagrammatic view of a construction embodying the present invention, including an injection gas source, a fluid forcing nozzle, and a plastic source.

FIG. 2 is a partial, exploded, view of the downstream end of the fluid forcing nozzle of FIG. 1, showing the valve cavity and valve part utilized in the construction of the present invention.

FIG. 3 is a sectional view, taken in the direction of the arrows, along the section line 3—3, of FIG. 4.

FIG. 4 is a partial sectional view, taken in the direction of the arrows, along the section line 4—4, of FIG. 3.

FIG. 5 is a view similar to FIG. 4, but showing the valve part in a second position with a second flow channel established.

It is to be understood that the present invention is not limited in its application t o the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DETAILED DESCRIPTION OF THE PREFERRED EMBODIMENTS

Referring now to FIG. 1, there is shown an injection molding apparatus 20, including a gas source 21 and a plastic source 22. It should be understood that the terms gas source and plastic source are generic. For example, the gas source 21 can be a source of injection fluid or gas. The plastic source 22 can be a source of molten plastic, synthetic plastic resin, or other desired material. Also included in the injection molding apparatus 20 is a fluid forcing nozzle 23. The fluid forcing nozzle 23 has an upstream end 24 for communication with an end of an associated injection molding machine (not shown), and a downstream end 25 for fluid communication with a sprue 26 of an associated mold body 27 through tip 30 (FIGS. 4 and 5).

Referring now to FIGS. 2, 4 and 5, it can be seen that the fluid forcing nozzle 23 has a body portion 28 having an axially extending bore 29 for establishing a flow channel for the molten plastic or synthetic resin 31. At or near the downstream end of the axially extending bore 29 is a valve cavity 34. The valve cavity 34 is complimentary in shape to a valve part 36.

Referring now specifically to FIG. 4, the valve part 315 is shown in a first position wherein it forms a first flow channel consisting of the axially extending bore 29 and the diametral bore 40 in the valve part 36. The first flow channel also includes passage 41. In the tip 30. From there the molten plastic or synthetic resin 31 passes into the sprue 26.

Referring to FIGS. 2 and 5, the valve part 36 is shown in its second position, wherein a second flow channel is established in communication with a second bore 48 which is in fluid communication by way of a connector 47 with the gas source 21. The second flow channel for the injection gas is formed by the second bore 48, valve part passage 49, a portion of the axially extending bore 29 and the passage 41 in the tip 30.

By moving the valve member 36 to its second position, not only is the second flow channel established for the injection gas, but because of the tilting of the diametral bore 40, the first flow channel is blocked. No further synthetic resin or molten plastic 31 can flow through the tip 30.

The valve part 36 is rotated by the U-shaped or bifurcated member 53, which is connected to the link 50 by way of the pin 51 which fits in hole 52. The bifurcated member 53 is reciprocated back and forth to move the valve part 36 from its first position, in which said first flow channel is formed as shown in FIG. 4, to its second position, in which said second flow channel is formed, as shown in FIG. 5. This is done by link 50 which is attached, at its other end, to linkage adapter 55. Linkage adapter 55 is connected to the cylinder shaft (not shown) of cylinder 56, which is attached to the fluid forcing nozzle 23 by the first cylinder bracket 57 and the second cylinder bracket 58. The cylinder 56 operates by means well known in the art by air or fluid admitted under pressure through supply port 60.

The valve part 36, may be cylindrically shaped, barrel-shaped, tapered or of other desirable cross section as long as it is symmetrical about at least one axis of rotation. It is to be noted that the inlet 49a of the valve part passage 49 is coaxial with both the axis of the connector 47 and the valve part 36, while the outlet 49b of the valve part passage 49 is midway of the valve part 36 on the periphery thereof, and is perpendicular to the inlet 49a.

Thus, by carefully analyzing the problems presented in the prior art injection nozzles, I have invented a novel fluid forcing nozzle which has eliminated serious problems in the art and has provided a simplified construction having a minimum number of moving parts. The moving parts which are present have been moved as far downstream as possible to eliminate any concern that the small amounts of aerated resin that will be first injected into the mold after the end of any mold cycle will affect the quality of the molded parts.

I claim:

1. An apparatus for molding a plastic part including:
   a) a gas source for supplying pressurized injection fluid or gas,
   b) a plastic source for supplying a molten thermoplastic material,
   c) a mold body for receiving said molten thermoplastic from said plastic source, said mold body including a sprue,
   d) a fluid forcing nozzle secured between said source of thermoplastic material and said sprue of said mold body, said fluid forcing nozzle including:
      (i) a body portion having an upstream end in fluid communication with said source of thermoplastic material, and a downstream end in contact with said sprue of said mold body, said body portion having an axially extending bore for establishing a first flow channel for said molten thermoplastic material,
      (ii) a valve cavity provided in said bore, and in fluid communication therewith, to receive a valve part,
      (iii) a second bore in fluid communication with said valve cavity for establishing a second flow channel for said pressurized fluid or gas, and
      (iv) a valve part rotatable between a first position and a second position being received in said valve cavity, wherein when said valve part is in said first position, said first flow channel for said thermoplastic material is established and is continuous between the upstream end of said body portion and said downstream end of said body portion, and when said valve part is in its second position, a portion of said first flow channel is blocked, and said second flow channel for said pressurized injection fluid or gas is established and is in fluid communication with said second bore and said sprue of said mold body.

2. The apparatus defined in claim 1, wherein said valve part further includes:
   a) a diametral bore which forms a portion of said first flow channel when said valve part is in its first position, and
   b) a valve part passage provided in said valve part which forms a portion of said second flow path when said valve member is in said second position.

3. The apparatus defined in claim 2, and further including:
   a) means to actuate said valve part.

4. The apparatus defined in claim 1, wherein said valve part is a cylinder.

5. The apparatus defined in claim 1, wherein said valve part is tapered.

6. The apparatus defined in claim 5, wherein said inlet of said valve part passage provided in said valve part is coaxial with the axis of rotation of said valve part.

7. An apparatus as recited in claim 1, wherein said valve part includes two discrete flow passages such that the passage portion in said valve part which provides a portion of said first flow channel does not communicate with the passage part in said valve part which defines said second flow channel.

8. A fluid forcing nozzle for use in injection molding machines to inject molten thermoplastic and pressurized fluid or gas into a mold cavity, said nozzle including:
   a) a body portion having an upstream end for communication with an end of an injection molding machine, and a downstream end for fluid communication with a sprue of a mold body, said nozzle body including:
      (a) an axially extending bore for establishing a first flow channel,
      (ii) a valve cavity provided in said axially extending bore and in fluid communication therewith, and
      (iii) a second bore in fluid communication with said valve cavity,
   (b) a valve part rotatable in said valve cavity for operation between a first position and a second position wherein when said valve part is in said first position, said first flow channel is established between said upstream end and said downstream end of said body portion for injection of said molten thermoplastic, and when said valve part is in its second position, a second flow channel is established which provides fluid communication between said second bore and said downstream end of said nozzle body portion for injection of said pressurized fluid or gas, while blocking said first flow channel, and
   c) means to activate said valve part.

9. The fluid forcing nozzle defined in claim 8, wherein said valve part includes:
   a) a diametral bore used to establish fluid communication between said upstream end and said downstream end of said body portion, when said valve part is in said first position, and
   b) a valve part passage provided in said valve part to provide communication between said second bore and said downstream end of said body portion when said valve part is in said second position.

10. The fluid forcing nozzle defined in claim 9, wherein said activating means include:
    a) a bifurcated member attached to said valve part, and
    b) a device connected to said bifurcated member to reciprocate the same to move said valve part between said first and said second positions.

11. A fluid forcing nozzle as recited in claim 8, wherein said valve part includes two discrete flow passages such that the passage portion in said valve part which provides a portion of said first flow channel does not communicate with the passage part in said valve part which defines said second flow channel.

12. A fluid forcing nozzle for use in injection molding machines, said nozzle including:
    a) a body portion having an upstream end for communication with an end of an injection molding machine, and a downstream end for fluid communication with a sprue of a mold body, said nozzle body including:
       (i) an axially extending bore for establishing a first flow channel, (ii) a valve cavity provided in said axially extending bore and in fluid communication therewith, and (iii) a second bore in fluid communication with said valve cavity, (b) a valve part mounted in said valve cavity for operation between a first position and a second position wherein when said valve part is in said first position, said first flow channel is established between said upstream end and said downstream end of said body portion, and when said valve part is in its second position, a second flow channel is established which provides fluid communication between said second bore and said downstream end of said nozzle body portion, while blocking said first flow channel, wherein said valve part includes:

(i) a diametral bore used to establish fluid communication between said upstream end and said downstream end of said body portion, when said valve part is in said first position, and (ii) a valve part passage provided in said valve part to provide communication between said second bore and said downstream end of said body portion when said valve part is in said second position, and c) means to activate said valve part, wherein said actuation means include:

(i) a bifurcated member attached to said valve part at spaced locations, and (ii) a device connected to said bifurcated member to reciprocate the same to move said valve part between said first and said second positions, wherein said device to reciprocate includes:

(A) a fluid operated cylinder having a cylinder shaft for reciprocating motion, (B) a linkage adapter connected to an end of said cylinder shaft, and (C) a link connected between said linkage adapter and said bifurcated member.

13. The fluid forcing nozzle defined in claim 12, wherein said device to reciprocate further includes:

a) a first cylinder bracket attached to said body portion, and b) a second cylinder bracket attached to said body portion, said cylinder being fixedly attached to said body portion by said first and said second cylinder brackets.

14. The fluid forcing nozzle defined in claim 13, and further including:

a) a tip mounted in said bore at the downstream end thereof.

15. The fluid forcing nozzle defined in claim 14, wherein said valve part provided in said valve part to provide communication between said second bore and said downstream end of said body portion when said valve part is in said second position has an inlet coaxial with the axis of rotation of said valve part.

16. A fluid forcing nozzle as recited in claim 12, wherein said valve part includes two discrete flow passages such that the passage portion in said valve part which provides a portion of said first flow channel does not communicate with the passage part in said valve part which defines said second flow channel.

17. A shutoff nozzle for use in gas assisted injection molding of fluidized thermoplastics, said shutoff nozzle comprising:

a) a body portion having an upstream end for communication with an end of an injection molding machine, and a downstream end for fluid communication with a sprue of a mold body, said nozzle body including:

(i) an axially extending bore for establishing a first flow channel for said fluidized thermoplastic, said axially extending bore extending substantially from said upstream end to said downstream end of said nozzle body, (ii) a valve cavity near the downstream end of said axially extending bore and in fluid communication therewith, and (iii) a second bore in fluid communication with said valve cavity for establishing a second flow channel for injection of a pressurized fluid or gas, (b) a valve part mounted in said valve cavity for rotary movement between a first position and a second position, wherein when said valve part is in said first position, said first flow channel for fluidized thermoplastic is established and is continuous between said upstream end of said body portion and said downstream end of said body portion, and when said valve part is in its second position, a portion of said first flow channel is blocked, and said second flow channel for said pressurized fluid or gas is established and is in fluid communication with said second bore, c) means to actuate said valve part including (i) a bifurcated member attached to said valve part at two spaced locations, and (ii) a device connected to said bifurcated member to reciprocate the same to move said bifurcated member, and thus said valve part, between said first and said second positions, said device being a link member with a longitudinal axis, said link member being reciprocable along said axis.

18. The shutoff nozzle defined in claim 17, wherein said device to reciprocate includes:

a) a fluid operated cylinder having a cylinder shaft for reciprocating motion, b) a linkage adapter connected to an end of said cylinder shaft, and c) a link connected between said linkage adapter and said bifurcated member.

19. A shut off nozzle as recited in claim 17, wherein said valve part includes two discrete flow passages such that the passage portion in said valve part which provides a portion of said first flow channel does not communicate with the passage part in said valve part which defines said second flow channel.

* * * * *